No. 674,151. Patented May 14, 1901.
L. J. ATWOOD.
SHADE HOLDER FOR ELECTRIC LAMPS.
(Application filed Oct. 31, 1898.)
(No Model.)
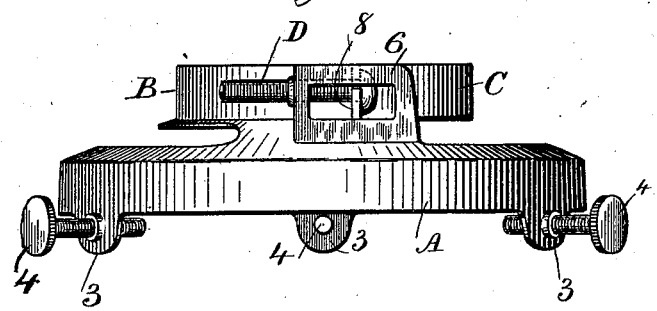
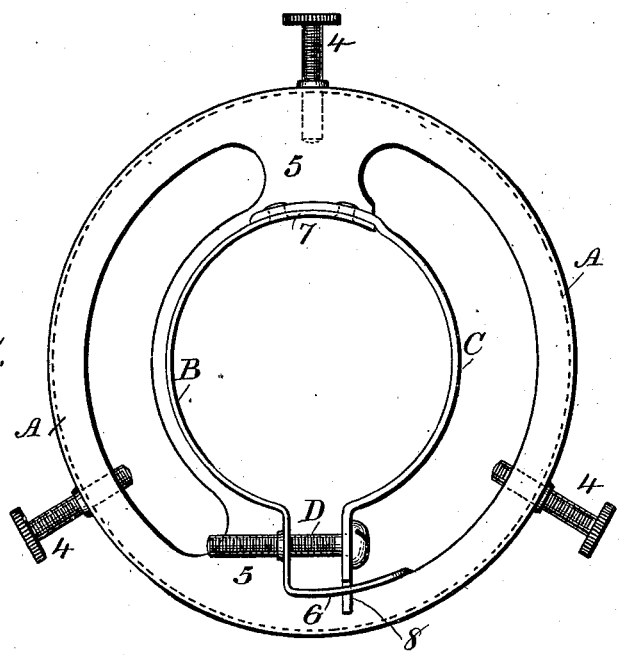
Witnesses
Chas H Smith
J. Staib
Inventor
Lewis J. Atwood
per L. W. Serrell & Son
Attys

UNITED STATES PATENT OFFICE.

LEWIS J. ATWOOD, OF WATERBURY, CONNECTICUT, ASSIGNOR TO THE PLUME AND ATWOOD MANUFACTURING COMPANY, OF SAME PLACE.

SHADE-HOLDER FOR ELECTRIC LAMPS.

SPECIFICATION forming part of Letters Patent No. 674,151, dated May 14, 1901.

Application filed October 31, 1898. Serial No. 694,999. (No model.)

*To all whom it may concern:*

Be it known that I, LEWIS J. ATWOOD, a citizen of the United States, residing at Waterbury, in the county of New Haven and State of Connecticut, have invented an Improvement in Shade-Holders for Electric Lamps, of which the following is a specification.

The object of the present invention is to obtain from a sheet-metal blank as much of the shade-holder and the clamping-ring as is consistent with strength and durability and to combine with the integral parts a separate half clamping-band that is fastened onto the integral portion at one end, and the other end slides in a mortise that becomes a guide, and a screw is employed to clamp the parts of the band to the electric light or other fixture.

In the drawings, Figure 1 is a plan view illustrating the present improvement, and Fig. 2 is an elevation showing the slotted portion.

The sheet-metal ring A is of proper size and shape to receive and hold the shade. It is generally provided with a flange having ears 3, through which pass the clamping-screws 4, and there are arms 5 extending inward and integral with the ring A, and the half-band B, that is semicircular and of approximately the proper size to correspond to the electric light or other fixture to which the shade-ring is to be applied, is integral with the arms 5, and there is a guide 6, that is slotted horizontally similar to that in my Patent No. 437,008 and which guide is made integral with the sheet-metal ring and formed as an integral continuation of the extension of the half-band B.

The half-band C is a separate piece of metal and is riveted or soldered at 7 to one end portion of the half-band B, and the other end 8 of the half-band C is reduced in width and forms a finger passing through and guided by the slotted guide 6, and the screw D passes freely through a hole in one portion of the half-band C and screws into the integral extension 4 of the half-band B, so that by this screw D the band portions can be set up as required to clamp around the electric-light fixture or similar device, and the end 8 will move backward or forward in the slot in the guide 6 and in this manner accommodate the clamping-band to the size of the lamp-socket or other fixture.

It is to be understood that the integral parts are to be cut out by punches and stamped up by suitable dies into the proper shape, and in consequence of the half-band C being a separate piece from the integral half-band B the same can be of any desired thickness of metal adapted to receive the screw D and possessing the required stiffness and strength to clamp around the electric-light socket or other fixture, and the half-band B, having a base-flange, is sufficiently stiff to retain its shape and not become displaced in clamping the electric-light fixture, and the band C is elastic and adapts itself to such fixture in clamping the same.

I claim as my invention—

A shade-holder comprising with a sheet-metal ring and integral arms extending inward and a rigid half-band B integral with the arms, an integral extension of the half-band perforated for the clamping-screw and a curved slotted guide 6 integral with the shade-ring and forming a continuation of the half-band extension, and the spring half-band C secured to one end of the integral half-band B and having a perforation adjacent to its free end for the clamping-screw, and reduced in width at its free end and said reduced end passing into the curved slotted guide 6 and the screw for connecting and clamping the parts, substantially as set forth.

Signed by me this 27th day of October, 1898.

L. J. ATWOOD.

Witnesses:
 GEO. T. PINCKNEY,
 S. T. HAVILAND.